United States Patent [19]

Urbank

[11] Patent Number: 5,722,809
[45] Date of Patent: Mar. 3, 1998

[54] TRAILER-DOLLY COMBINATION FOR SMALL OR PERSONAL WATERCRAFT

[76] Inventor: Vincent A. Urbank, 609 Elizabeth Ave., Toms River, N.J. 08753

[21] Appl. No.: 418,457

[22] Filed: Apr. 7, 1995

Related U.S. Application Data

[63] Continuation-in-part of Ser. No. 83,519, Jun. 30, 1993, abandoned.

[51] Int. Cl.⁶ .................................................. B60P 3/10
[52] U.S. Cl. .................... 414/529; 280/414.1; 414/483
[58] Field of Search .................... 280/414.1; 114/344; 414/529–536, 494, 559, 482–485

[56] References Cited

U.S. PATENT DOCUMENTS

| | | | |
|---|---|---|---|
| 2,661,108 | 12/1953 | Horn et al. | 280/414.1 |
| 2,711,259 | 6/1955 | Jones | 280/414.1 |
| 2,797,008 | 6/1957 | Banker | 414/529 |
| 2,958,432 | 11/1960 | Milhem | 414/529 |
| 3,140,003 | 7/1964 | Horner | 280/414.1 |
| 3,649,064 | 3/1972 | Bledsoe | 280/414.1 |
| 3,779,573 | 12/1973 | Gullberg et al. | 280/414.1 |
| 4,214,774 | 7/1980 | Kluge | 280/414.1 |
| 4,365,923 | 12/1982 | Lubbers | 414/483 |
| 4,420,165 | 12/1983 | Goodin | 280/414.1 |
| 5,069,471 | 12/1991 | Van Der Linden et al. | 280/414.1 |
| 5,320,475 | 6/1994 | Pinder | 414/529 |

FOREIGN PATENT DOCUMENTS

| | | | |
|---|---|---|---|
| 8705568 | 9/1987 | European Pat. Off. | 414/529 |
| 8803099 | 5/1988 | European Pat. Off. | 280/414.1 |
| 1425470 | 12/1965 | France | 280/414.1 |
| 2519592 | 7/1983 | France | 280/414.1 |
| 2352928 | 4/1974 | Germany | 280/414.1 |
| 2946922 | 6/1981 | Germany | 280/414.1 |
| 1540833 | 2/1979 | United Kingdom | 280/414.1 |

*Primary Examiner*—Karen B. Merritt
*Assistant Examiner*—R. B. Johnson
*Attorney, Agent, or Firm*—Charles I. Brodsky

[57] ABSTRACT

A trailer adapted to carry in piggy-back fashion, a removable, replaceable dolly onto which small or personal watercraft is to be loaded or off-loaded. The trailer is provided with higher pressure tires capable of withstanding such impacts and jarring as are associated with highway usage, while the dolly is provided with lower pressure tires for travel over sand, dirt, gravel, or other off-the road use. A first stop, on the trailer, limits movement of the dolly once secured; and a second stop, on the dolly, limits the movement of the watercraft. A plurality of rollers are employed to ease the dolly loading with the trailer, and the watercraft loading with the dolly.

4 Claims, 5 Drawing Sheets

TRAILER-DOLLY COMBINATION FOR SMALL OR PERSONAL WATERCRAFT

This is a continuation-in-part of application Ser. No. 08/083,519, filed Jun. 30, 1993 now abandoned.

Field of the Invention

This invention relates to the transportation of small or personal watercraft and, more particularly, to the transportation of such watercraft as jet skis, aluminum boats, and fiberglass boats, for example, by their owners, by those who may lease them, and by dealers, in general.

BACKGROUND OF THE INVENTION

As is well known and understood, small or personal watercraft such as jet skis, aluminum boats, fiberglass boats, etc. are too heavy to carry about manually and require some means of transportation, if only from the tail-end of a pickup truck to the water's edge. As is also well known and understood, such small or personal watercraft are transported about usually by trailer, constructed sufficiently sturdy so as to travel on highways, over-the-road, and with tires capable of withstanding such impacts and jarring as are typically associated with such roadway usage. While perfectly acceptable in transporting small or personal watercraft to a water's edge when a boat ramp is accessible, such trailering arrangements prove less than optimum in use where it is necessary to back the vehicle to the water's edge by traveling on sand, un-packed dirt, loose gravel, or other off-the road non-packed material.

As is similarly well known and understood, the bringing of the small or personal watercraft to the water's edge over sand, loose dirt or non-packed gravel can be facilitated by transporting it by means of a dolly, of lesser weight than a trailer, and equipped with lower pressure, balloon tires, than are associated with the higher pressure tires used in highway, or over-the-road travel. Obviously, however, such dollies are not generally amenable to be, themselves, pulled over the road in vehicular traffic—and, if loaded in the back of a pickup truck—requires two or more persons to typically lift the dolly off from the pickup bed to place it onto the ground, or to lift it back into the bed after use. Clearly, that is not always an easy thing to do—and some improved way of transporting these small or personal watercrafts would be desirable.

Although these problems might not exist where paved, or packed launching ramps are available, such access points are difficult to locate, and where they exist, are usually few in number. As a result, such ramps are usually crowded, and it is not unusual for one to have to sit in line, awaiting his, or her turn to back the vehicle onto the ramp in order to load, or off-load the small or personal watercraft for use.

OBJECTS OF THE INVENTION

It is an object of the present invention, therefore, to provide an easier, improved manner of being able to transport small or personal watercraft about in use, and to be able to load and/or off-load them simply, quickly, and efficiently.

It is another object of the invention to provide an apparatus that will allow for this objective to be achieved, in an arrangement which will continue to facilitate the transporting of the small or personal watercraft on highways, over-the-road, while easing the manner of transporting the jet skis, aluminum boats, fiberglass boats, etc. on sand, unpacked dirt, loose gravel, or any other type of unpaved road surface.

It is a further object of the invention to provide apparatus to permit this transporting of small or personal watercraft by one person, acting alone, without the need for further assistance from others in the loading, or off-loading, of the craft.

It is an additional object of the invention to provide such apparatus which facilitates manual loading and off-loading of the watercraft by one person, acting alone, without using winches, pulleys or other mechanized means.

SUMMARY OF THE INVENTION

As will become clear from the following description, these objectives of the invention are accomplished through the use of a unique trailer-dolly combination, in which the trailer is adapted to carry in piggyback fashion, a removable, replaceable dolly onto which the small or personal watercraft is to be loaded or off-loaded. As will be seen, the trailer is provided with higher pressure tires capable of withstanding such impacts and jarring as are associated with highway travel and over-the-road usage (for example, capable of sustaining pressures of the order of 60 psi), while the dolly is provided with lower pressure tires for travel on sand, unpacked dirt, or loose gravel (for example, capable of sustaining pressures of the order of 20 psi). As will be further made clear, a first stop is provided on the trailer, to limit movements of the dolly once it is secured into position, whereas a second stop, provided on the dolly, is added so as to limit the movement of the small or personal watercraft once it is loaded. As will also be described in detail, a plurality of rollers are employed in the combination, so as to ease the loading of the dolly with the trailer, and so as to ease the loading of the watercraft with the dolly. To facilitate one-person manual loading and off-loading of the dolly with the trailer, the combination of the invention incorporates a tiltable handle on the dolly to assist in its loading and off-loading, and with a unique, rotatable assembly on the trailer so as to facilitate the loading and off-loading of the small or personal watercraft with a reduced effort of the user.

BRIEF DESCRIPTION OF THE DRAWINGS

These and other features of the invention will be more clearly understood from a consideration of the following description, taken in connection with the accompanying drawings, in which.

DETAILED DESCRIPTION OF THE DRAWINGS

Figure 1:
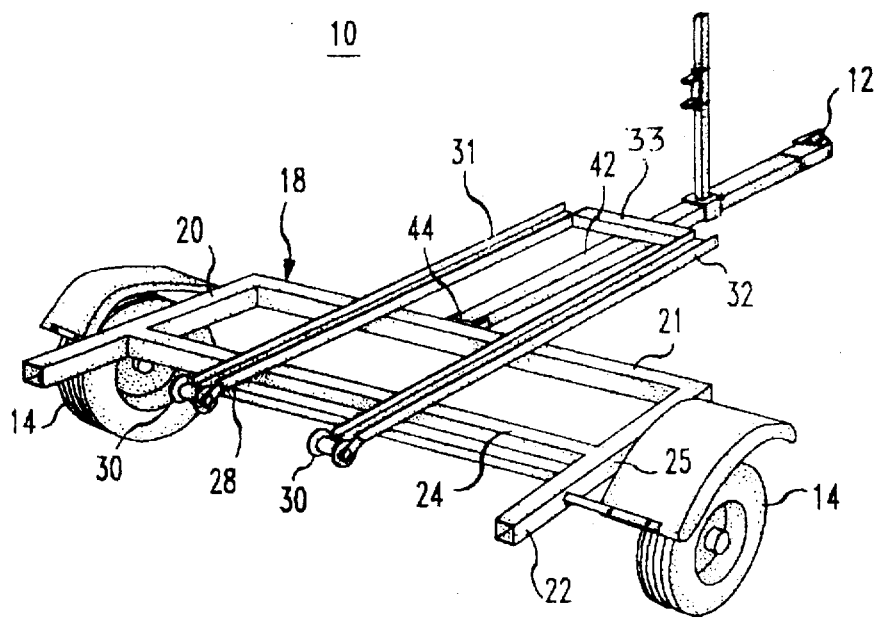
FIG. 1 is a pictorial view of the trailer of the invention as it would appear with the dolly being off-loaded.

In FIG. 1, the trailer 10 is adapted to be transported about by any appropriate vehicle through any standard hitch arrangement 12 in known manner. The trailer 10 will be understood to include a pair of higher pressure tires 14 capable of sustaining highway travel and over-the-road pressures and impacts, and may typically be of the order of 60 psi pressure.

As will he seen, the trailer 10 is provided with a first frame assembly 18 extending between the tires 14, and comprising three arms 20, 21, 22, with the arms 20 and 22 being connected by a further arm 24 perpendicularly connected with the arms 20, 22 essentially at their midpoints 25. A second frame assembly 28 is also shown, particularly extending over the arms 21 and 24, and between the arms 20 and 22 of the first frame assembly 18, culminating in a pair of tiltable rollers 30 at the ends of their own parallel arms 31, 32, shown as being "slotted" with channels or a U-shape configuration to accept the dolly of the invention in a manner to be described.

Figure 5:
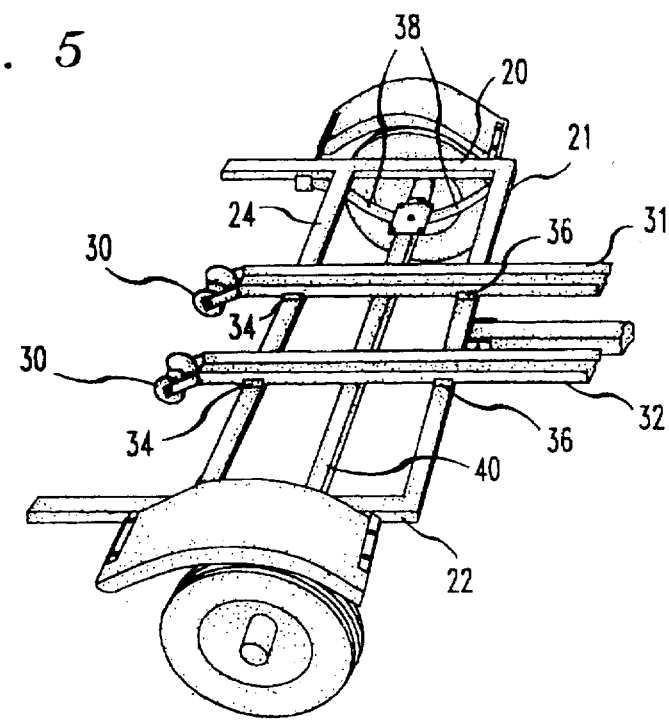
FIGS. 5 and 6 are pictorial views helpful in an understanding of the manner by which the dolly of the invention is loaded onto the trailer.

As is more clearly shown in FIG. 5, the slotted arms 31, 32 are welded (or otherwise affixed) to the arm 24 of the assembly 18 at the point 34, and further welded (or otherwise secured) to the arm 21 of the assembly 18 as at 36. A pair of braces 38 (or other support) join the arms 20 and 22 of the assembly 18 to a horizontal bar 40 extending between the tires 14 (one such brace 38 at either end), so as to allow the two assemblies 18, 28 to be angularly rotatable with respect to the ground (FIG. 7) so as to ease the loading and off-loading of the dolly onto the trailer 10. As will be seen and understood, a further arm 33 of the frame assembly 28 rests on the long arm 42 of the trailer 10, when the dolly is loaded into position—with the arm 42 being coupled to the trailering vehicle as at 12, and with the arm 42 being hingably connected to the arm 21 of the frame assembly 18, as at 44 in allowing the degree of rotation needed (See FIG. 1).

Figure 2:
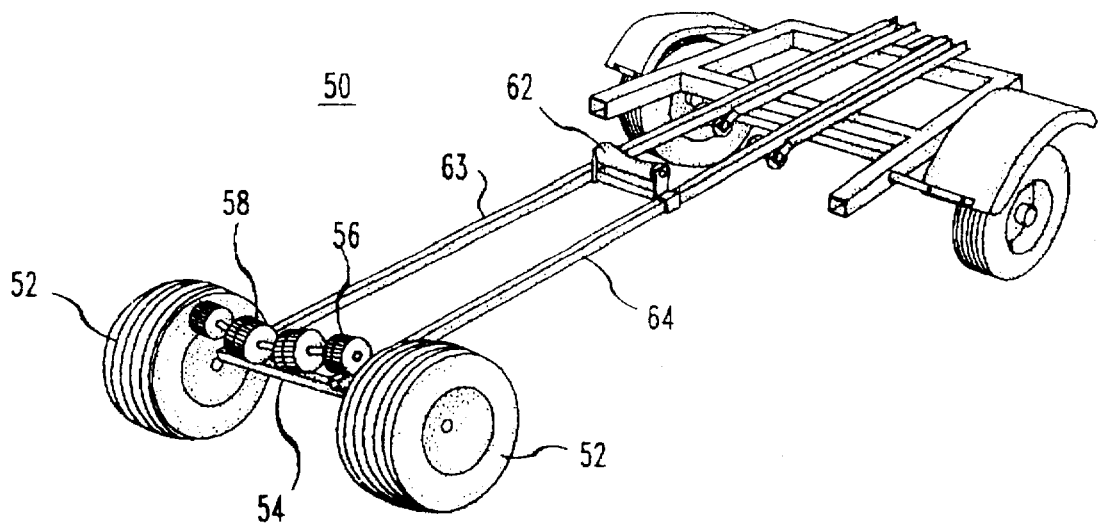
FIG. 2 is a pictorial view of the dolly and trailer of the invention, prior to its being loaded with any small or personal watercraft such as a jet ski, aluminum boat, fiberglass boat, etc. to be transported about.

The dolly of the invention is shown at 50 in FIG. 2, with its own pair of lower pressure tires 52 of a balloon-type configuration, for example, capable of sustaining lower pressures—of the order of 20 psi—so as to permit their transporting about on sand, unpacked dirt, loose gravel or other uneven or non-packed surfaces, and not generally intended for use in highway or over-the-road travel. An axle 54 joins the tires 52 together, and itself carries two pairs of rollers 56, 58 onto which the small or personal watercraft eventually rides in being loaded and off-loaded from the dolly. As is more clearly seen from FIG. 6, the dolly incorporates a pair of arms 63, 64 configured to slide over the tiltable rollers 30 of the frame assembly 28, and to fit within the channels of the slotted arms 31, 32 so as to be carried about on the trailer 10. As will be seen from FIG. 4, the length of the axle 54 is selected with respect to the length of the arm 21 so as to fit the tires 52 on the dolly 50 between the arms 20 and 22 of the assembly 18, in a manner to have the tires 52 off-the-ground, between the arms 20 and 22, when the dolly 50 is secured on the trailer 10, and being transported on the highway and over-the-road. As will be appreciated from FIG. 7, on the other hand, once the assemblies 18 and 28 are tilted into the position shown in FIG. 7, the tires 52 then extend to the ground, so as to allow the dolly 50 to slide off the frame assemblies, and to be released from the trailer.

Figure 3:
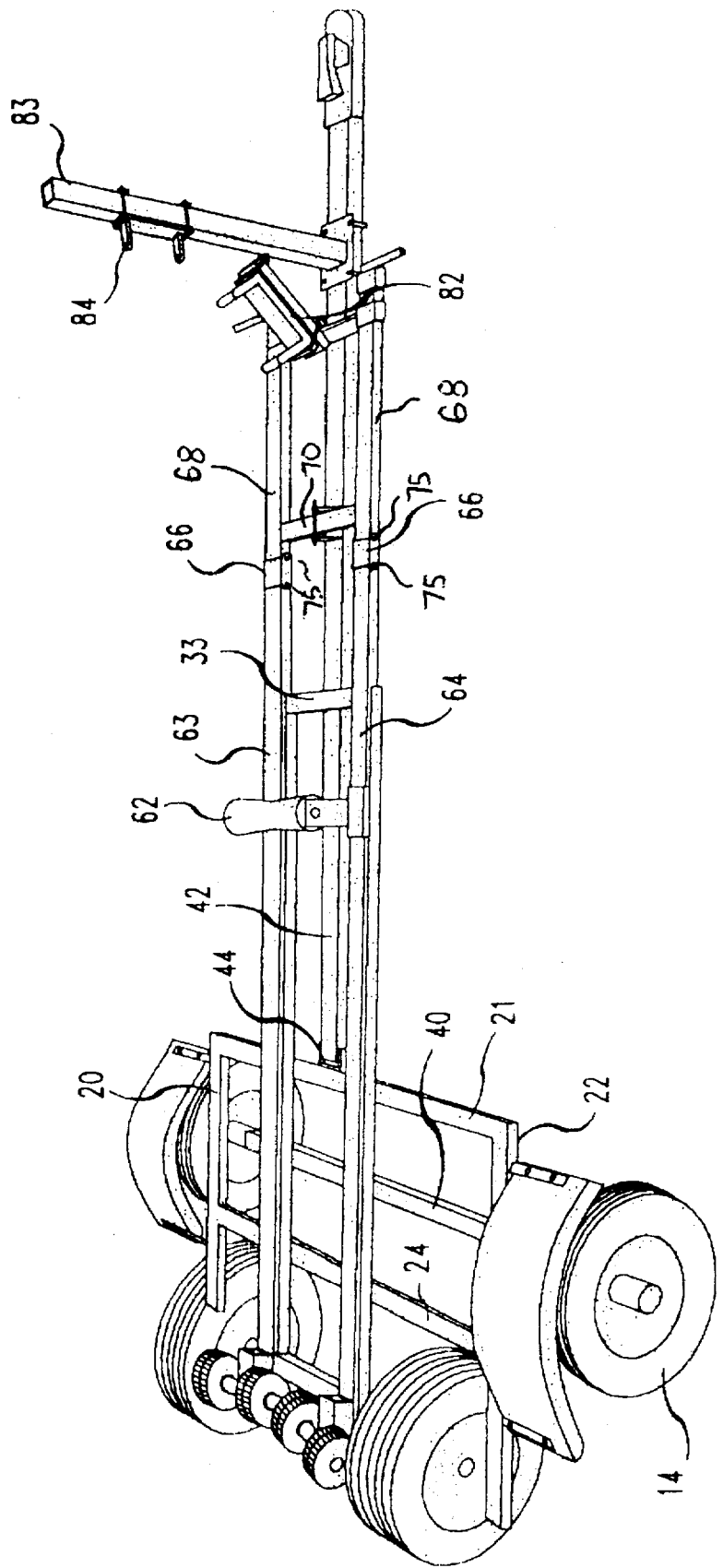
FIGS. 3 and 4 are side and front pictorial views showing the manner by which the dolly of the invention is loaded onto the trailer in piggyback fashion, without the small or personal watercraft being in place.
Figure 4:
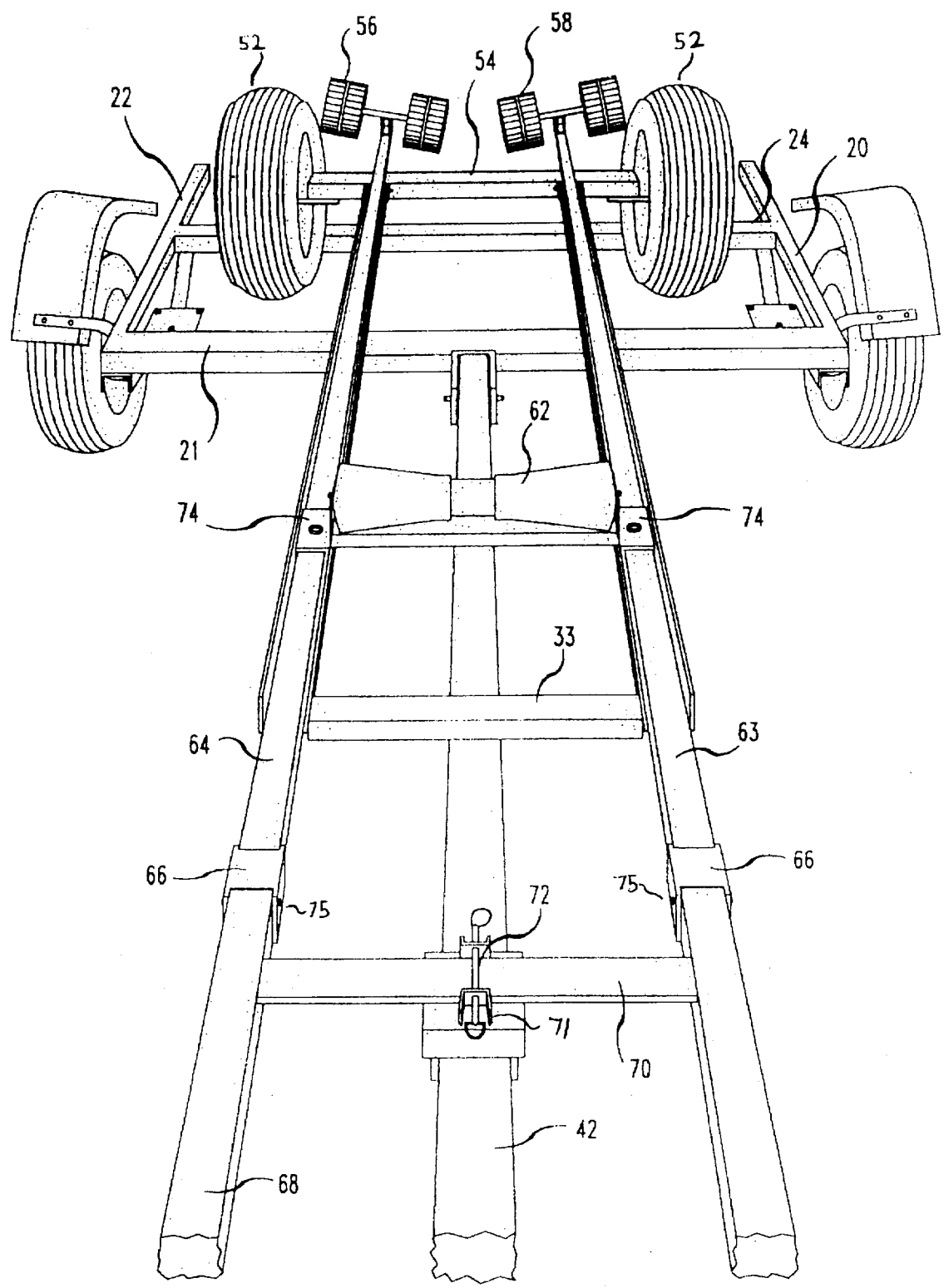
Figure 6:
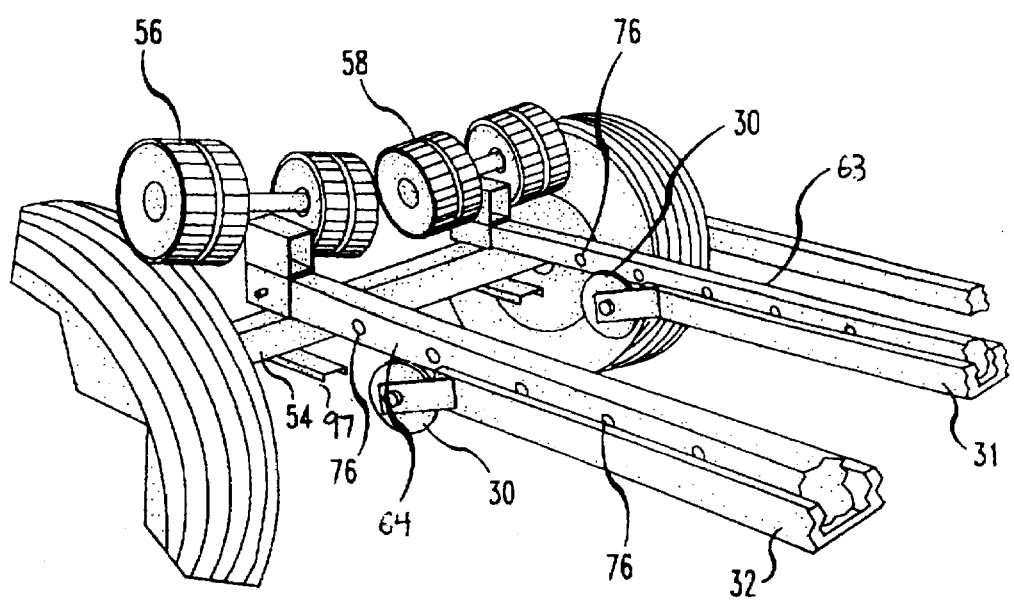

Also shown in FIGS. 2, 3 and 4 is a further roller 62 slidably secured into position along the length of the dolly arms 63, 64 to assist in supporting the bow of the small or personal watercraft to be loaded onto the dolly 50. A pair of clamps 66 are also shown in FIGS. 3 and 4, each with one or more pins 75, to join the dolly arms 63, 64 to a handle 68 for the dolly in a manner to make the handle 68 tiltably adjustable about the pins 75 to assist a user in loading and off-loading the dolly with the trailer, pulling or pushing it along as the assemblies 18 and 28 are tilted by the handle 68. As is more clearly shown in FIG. 4, furthermore, the handle 68 also includes an arm 70 which extends through a clamp 71 on the trailer arm 42, to lock the handle 68 by a pin 72, once the handle 68 is rotated flat onto the trailer arm 42 when the dolly 50 is in position on the trailer 10, ready to be transported. As also noted in FIG. 4, the roller 62 can be clamped, as at 74 to the dolly arms 63, 64, where appropriate, in supporting the bow weight of the watercraft. A series of apertures 76 are also shown in FIG. 6 along the sides of the dolly arms 63, 64 to align with pin or bolt connectors (not shown) on the inside of the slotted arms 31 and 32 of the assembly 28 to enable the dolly 50 to adjust for different lengths to watercraft to be carried by the trailer 10 and to distribute the weight more evenly along the dolly and not at its front end. In FIG. 3, the handle 68 is rotated downwardly, as shown, to rest upon the long arm 42 as the trailer 10 is to be pulled by any pickup truck, van, or other recreational or similar type motor vehicle away from the water's edge. A removable clamp (not shown) extends over and around the long arm of the trailer 42 and the arm 33 to prevent undesired rotation of the dolly 50 with respect to the trailer 10—the clamps being securable in place by pins traversing over the arm 33 and under the arm 42.

As will be readily appreciated by those skilled in the art, a jet ski, aluminum boat, fiberglass boat, etc. is usually not so heavy that one person acting alone, manually, without the benefit of winches, pulleys or other mechanized means, cannot position it onto the rollers 56, 58 of the dolly 50, and then pull it further onto the dolly 50, to rest on the bow roller 62 according to the invention. Once so done, the loaded small or personal watercraft 90 (FIG. 8) can be positioned forwardly on the dolly 50 until its bow rests on an included stop 82, secured to the tiltable handle 68, to support the front of the watercraft and to sustain it in position, once the watercraft is loaded, and ready for transportation over the highways or roadways. Such bow stop 82 (FIG. 8) will be appreciated to limit the movement of the watercraft on the dolly 50. To secure the watercraft, to the trailer for transporting it over the road, an additional post 83 and stop 84 are provided as extending from the arm of the trailer 42, adjacent to its hitch arrangement 12 in clamping the bow tip 80 of the watercraft 90 to the stop 84, as by means of a removable pin joining the bow tip 80 and the stop 84.

Figure 8:
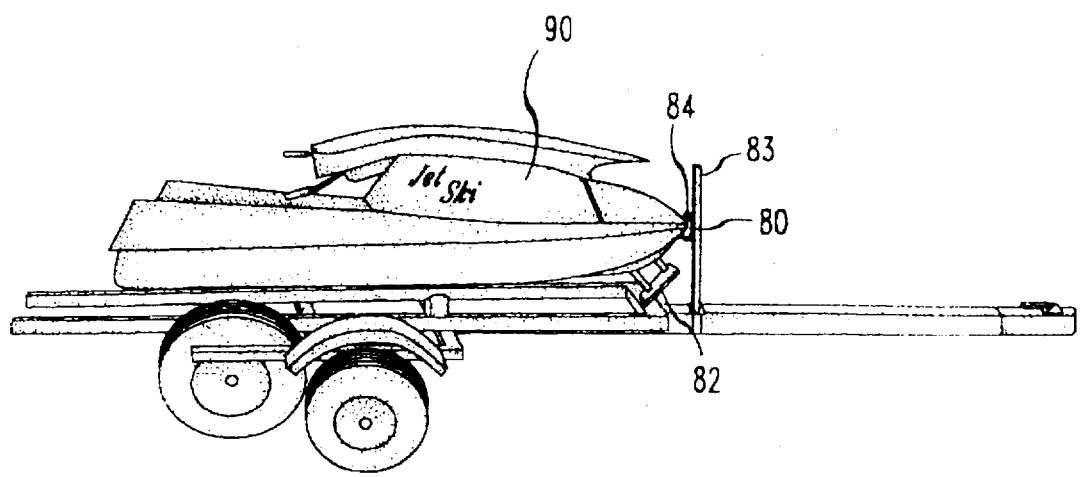
FIG. 8 Shows a jet ski type of personal watercraft, for example, loaded onto the dolly and secured in place with the trailer, ready to be transported about by any appropriate vehicular means.

Although illustrated as a jet ski 90 in FIG. 8, it will be appreciated that any type of small or personal watercraft can be loaded in this manner.

Figure 7:
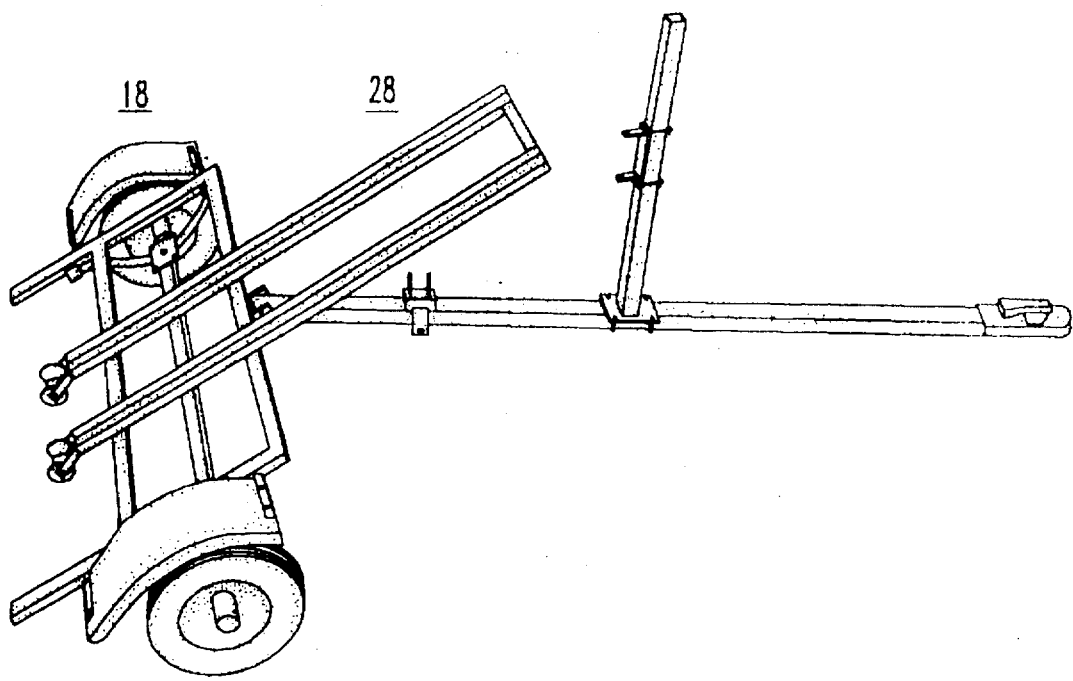
FIG. 7 is a pictorial view helpful in an understanding as to the manner of easy loading and off-loading of the dolly from the trailer.

In operation, once it is desired to off-load the watercraft 90, the watercraft is simply disconnected from the bow stops 82, 84, pushed rearwardly on the dolly 50, and the pin 72 on the clamp 71 removed. The handle 68 can then be rotated upwardly, the dolly stop 82 slid to the approximate height on the watercraft bow and the pin from the stop 84, placed through the bow of the watercraft 90 to secure it. A pin under the arm 33 (not shown) is then pulled to allow the trailer 10 and the dolly 50 to rotate downward, as shown in FIG. 7, until the dolly tires 52 then rest upon the ground. Further rearward movement on the handle 68 effectively removes the dolly 50 and its loaded watercraft 90 from the trailer, for ease of further transporting the watercraft 90 on the lower pressure balloon tires 52, across the sand, unpacked dirt, loose gravel, etc. to the water's edge. By constructing the dolly 50 and its arms 63, 64 of a galvanized steel, the dolly 50 can be continued to be pushed even into the water where the craft 90 is then off-loaded for use. At the end of the day, the process can be reversed—, with the watercraft 90 being loaded back onto the dolly 50, and then pulled by one person acting alone, manually, without mechanized means, back onto the tilted frame assemblies 18, 22, and then further pulled onto the trailer along the rollers 56, 58 and 62 until the watercraft is in proper position for securement with the dolly 50, and then with the trailer 10, rotating the tiltable handle 68 back into position for ultimate securement and trailering about. With the heavier construction of the trailer 10, along with its higher pressure tires 14, the entire piggy-back combination can then be transported back over the highways and roadways—and then off-loaded, once again, at a driveway, garage, or other destination where the dolly 50 and watercraft 90 could be off-loaded and stored for later use.

While there have been described what are considered to be preferred embodiments of the present invention, it will be readily appreciated by those skilled in the art that modifications can be made without departing from the scope of the teachings of the present invention. Thus, while the dolly 50 has been shown with two pairs of rollers 56, 58, any plurality of rollers, or even only one, may be employed to facilitate the loading or off-loading of the watercraft involved. The similar is true for the trailer 10, in that any plurality, or even only one, tiltable roller 30 may be used to ease the loading of the dolly 50, instead of the pair shown in FIG. 1. And wherein each of the frame assemblies 18 and 28 are shown as comprising three arms (20,21 & 22 and 31, 32 & 33) perpendicularly connected to form first and second substantially U-shaped frame assemblies—with the assembly 18 also including a fourth arm 24 perpendicularly joining the arms 20 and 22 to support the assembly 28—, any other appropriate supporting configuration may be utilized instead. And, whereas the invention has been described in the context of the user of a small or personal watercraft trailering it about between a home location and the water's edge, it will be appreciated that the trailer-dolly combination can be employed equally as well by a leaser of such equipment, or by a dealer in watercraft gear, simply in transporting the small or personal watercraft from a showroom or marina to a home location. As will be apparent to those skilled in the art, the teachings of the invention will work equally as well in all these environments—and, for such reason, at least, resort should be had to the claims appended hereto for a true understanding of the scope of the invention.

I claim:

1. The combination of a towable trailer and a hand operated dolly comprising:

a trailer including a first frame assembly; first, second and third arms perpendicularly connected to form a substantially U-shaped second frame assembly connected to and overlying said first frame assembly; said first and third arms of said second frame assembly being parallel and slotted to receive and support said dolly therein;

said trailer including a bar; first tire means mounted on said bar at locations laterally of said first and second frame assemblies; means for coupling said bar to said first frame assembly;

an elongated member pivotally connected at a first end thereof to said first frame assembly to permit said first and second frame assemblies to rotate about said bar, and means mounted at a second end of said elongated member for attaching the trailer to a towing vehicle; first roller means mounted on said first and third arms to enable said dolly and a watercraft thereon to be transferred on an off of said trailer;

said hand operated dolly being formed by a third frame assembly that includes a pair of spaced parallel dolly arms adapted to be received and supported in said first and third arms of said second frame assembly; an axle mounted on said third frame assembly adjacent an end of said dolly arms; second tire means spacedly mounted on said axle so that when said dolly is transferred on to said trailer said second tire means are located within said first frame assembly; second roller means mounted on said dolly arms to enable a watercraft to be transferred on and off of said dolly; hand means on said dolly for transferring said dolly on and off of said trailers via said first roller means;

said first tire means having a first pressure value and constructed to withstand the impacts of paved highway travel; said second tire means having a second pressure value equal to approximately one-third of said first pressure value and constructed to withstand the impacts of travel on unpaved surfaces but insufficient to withstand the impacts of paved highway travel.

2. The combination of claim 1 wherein a first stop is provided on said trailer to limit movement of said dolly when said dolly is loaded onto said trailer.

3. The combination of claim 1 wherein a stop is provided on said dolly to limit movement of said small or personal watercraft when said watercraft is loaded onto said dolly.

4. The combination of claim 1, also including means for securing said dolly with said trailer for travelling about.

* * * * *